A. E. KNOWLES.
APPARATUS FOR THE PURIFICATION OF ELECTROLYTIC GASES.
APPLICATION FILED FEB. 27, 1913.

1,073,246.

Patented Sept. 16, 1913.

2 SHEETS—SHEET 1.

WITNESSES

INVENTOR
A. E. KNOWLES
BY
ATTORNEY

A. E. KNOWLES.
APPARATUS FOR THE PURIFICATION OF ELECTROLYTIC GASES.
APPLICATION FILED FEB. 27, 1913.

1,073,246.

Patented Sept. 16, 1913.

2 SHEETS—SHEET 2.

WITNESSES

INVENTOR
A. E. KNOWLES
BY
ATTORNEY

UNITED STATES PATENT OFFICE.

ALBERT EDGAR KNOWLES, OF WOLVERHAMPTON, ENGLAND.

APPARATUS FOR THE PURIFICATION OF ELECTROLYTIC GASES.

1,073,246.  Specification of Letters Patent.   Patented Sept. 16, 1913.

Original application filed October 19, 1911, Serial No. 655,647. Divided and this application filed February 27, 1913. Serial No. 751,085.

*To all whom it may concern:*

Be it known that I, ALBERT EDGAR KNOWLES, a citizen of Great Britain, and a resident of Wilton Lodge, Wergs Road, Tettenhall, Wolverhampton, county of Stafford, England, managing director, have invented certain new and useful Improvements in Apparatus for the Purification of Electrolytic Gases, of which the following is a specification.

This invention comprises improvements in apparatus for the purification of electrolytic gases and has for its object to enable gas of greater purity to be obtained and further to render working more secure and economical, this application being a divisional application of my application for patent for apparatus for purification of electrolytic gases, Serial No. 655647, filed Oct. 19, 1911.

The gas may be passed to the purifying apparatus from an ordinary washer or separator following its production from water by electrolytic action. On its way to the purifier the gas may be passed through a suitable meter and is led to a suitable explosion trap and from that the gas passes to the heating chamber or the purifier proper. In its entry into this chamber the ingoing gas is preheated by the passage around the inlet pipe of the outgoing gas and vapor. The gas then passes through the contact material acting as a catalytic agent instead of over it and the gas and the water vapor, formed by the combination of the gas which is being collected and the one present as an impurity, pass out to a second trap where the vapor condenses and is removed. From this second trap the purified gas passes away through an outlet pipe to a suitable collector.

This purifier is used on each half of the electrolytic plant so that in one case the gas collected is hydrogen with oxygen to be dealt with as an impurity and in the other case oxygen is collected and hydrogen is dealt with as an impurity.

Figure 1:
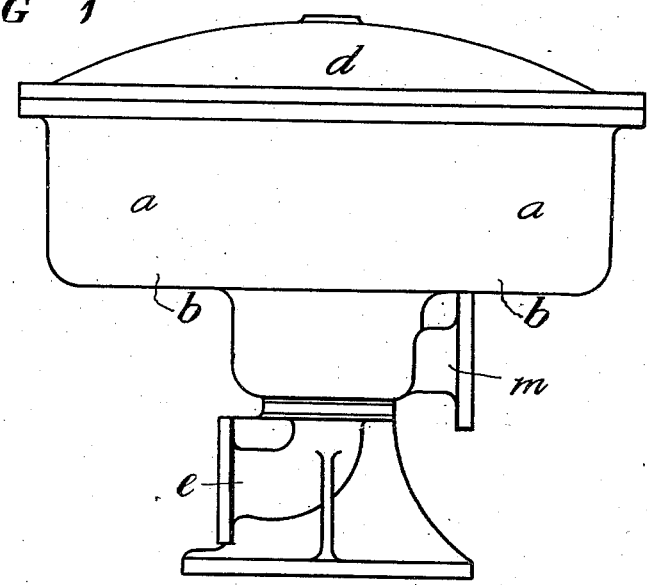
Figure 2:
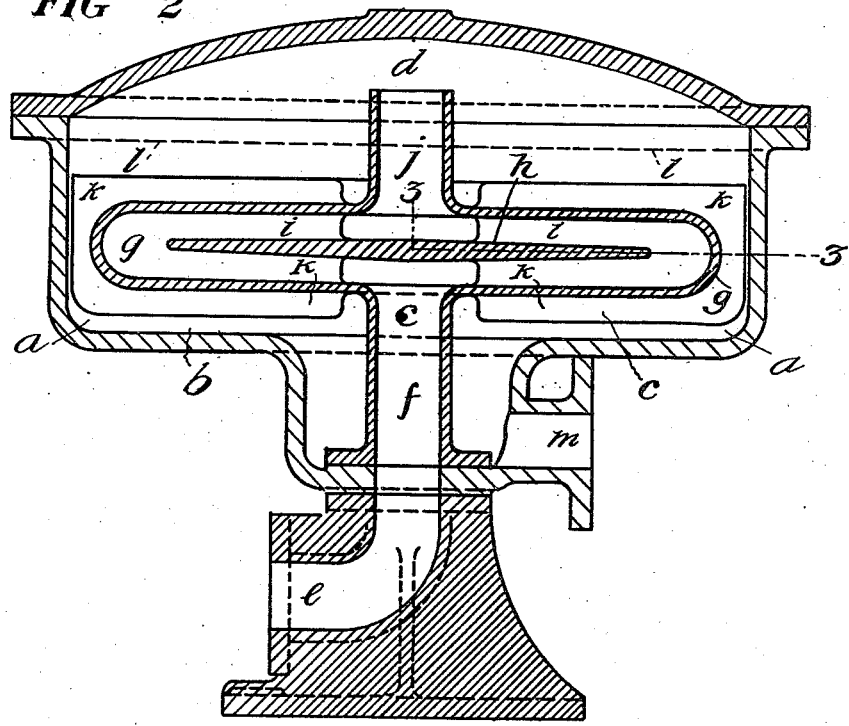
Figure 3:
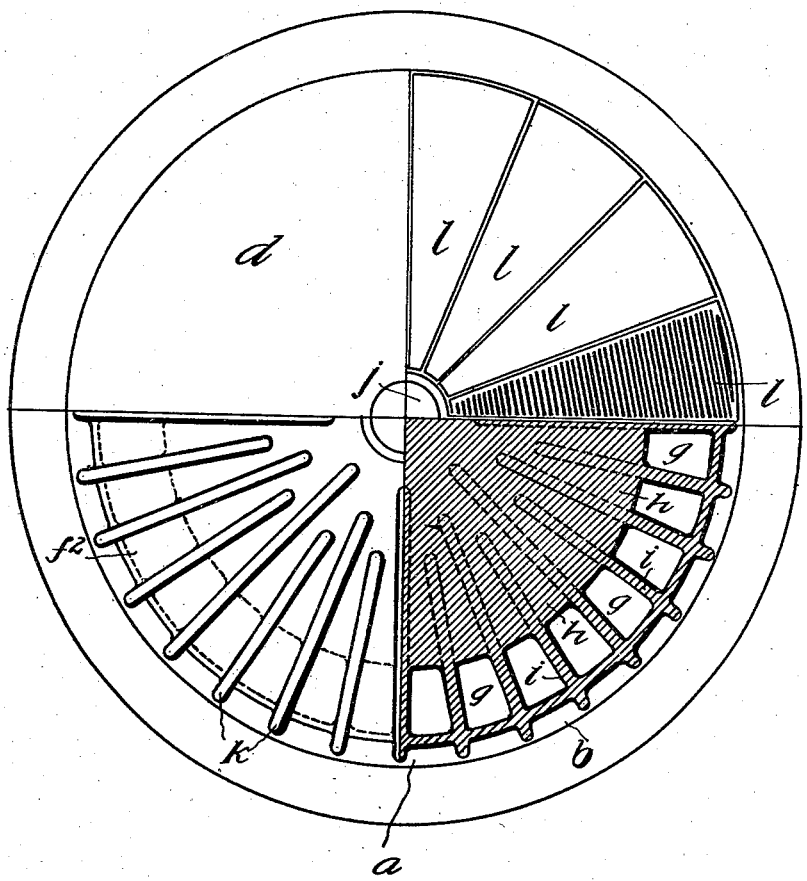

On the drawings: Figure 1 is an elevation of the purifier. Fig. 2 is a vertical section thereof. Fig. 3 shows at the first quarter reading clockwise a plan of Fig. 2 with the cover removed and the grids in place; at the second quarter a section at line 3—3 of Fig. 2; at the third quarter a plan of Fig. 2, with the cover and grids removed and at the last quarter a full plan of Fig. 2.

The purifier $a$ shown on these drawings comprises an outer chamber $b$ and an inner member $c$, the outer chamber is provided with suitable means such as a lid $d$ for allowing access to the interior and is suitably shaped to receive the inner or stand member $c$ and is further provided with a suitable gas inlet $e$. The inner or stand member $c$ is preferably formed with a cylindrical or other suitably shaped pillar $f$ which has a flat circular chamber $g$ cast or otherwise suitably formed or attached thereto at a convenient height from its base. The circular chamber $g$ has a deflecting disk $h$ which does not extend to the outer wall and this disk is supported by webs $i$ from the top and bottom surfaces of the chamber $g$ so that the chamber is divided into radial pockets above and below the disk, with communications between those below and those above around the periphery of the disk $h$, see Fig. 2, and the second quarter of Fig. 3. At the top of the chamber $g$ is an outlet $j$ leading into the outer chamber $b$. On the outer surfaces of the flat circular chamber $g$ are more radial webs or fins $k$ which preferably extend to the inner faces of the wall of the outer chamber $b$. The purifier is suitably heated and this construction of the inner chamber through which the gases enter it insures a very efficient heating as the gases are deflected and caused to follow devious paths and impinge against the hot ribs and webs.

Upon the fins or webs $k$ grids $l$ of porcelain or other suitable material are placed and upon these the contact material acting as a catalytic agent is spread. The gases pass down through the contact material past the exterior fins $k$ and around the inlet pillar $f$ to the outlet connection $m$. The hot outgoing purified gas and the vapor formed by the combination of the gas with the impurity thus assist in heating the ingoing gases and an effective preheating arrangement is formed.

The method of supplying heat to the purifier forms no part of the present invention. Any suitable arrangement for electric heating or for heating from a gas or other furnace may be followed and the heating may take place within the purifier or at the entry pipe to same according to the method chosen. When working is properly in progress little or no external or additional heat is required on account of the rise of temperature caused by the combination of the gases.

Although the construction here shown is a very effective one on account of the numerous ribs and surfaces that are provided for taking up the heat of the outgoing gas and vapor and imparting this heat to the ingoing gas before its contact with the catalytic agent, I may use other equivalent means for effecting the heat interchange between the outgoing and ingoing gas.

What I claim is:

1. In apparatus for the purification of electrolytic gases, a heater having a gas inlet and a gas outlet, an enlarged chambered part within said heater connected to said inlet, a passage for the gases issuing from the top of the chambered part around said part to the gas outlet and contact material arranged on the exterior of said chambered part.

2. In apparatus for the purification of gases a heater having a gas inlet and a gas outlet, said gas inlet having its orifice in said heater, an enlarged chambered part on said inlet, conducting webs formed on the exterior thereof, and contact material arranged on said webs so that gas issuing from the orifice of said inlet passes through said contact material and after combination impinges on said conducting webs, heating same and said webs conduct the heat to the chambered part of said gas inlet, substantially as and for the purpose set forth.

3. In apparatus for the purification of gases a purifier with an inner chamber, said chamber communicating with a gas inlet, an orifice on said gas inlet arranged above said chamber, webs on the exterior of said chamber, said webs supporting grids on which contact material is supported and a gas outlet from said purifier arranged below said chamber so that gas when issuing from the orifice of said gas inlet must pass the webs on said chamber on its way to said gas outlet.

4. In apparatus for the purification of gases a purifier with an inner chamber, said chamber communicating with a gas inlet, an orifice from said gas inlet, said orifice being above said chamber, webs on the exterior of said chamber serving to support grids on which contact material is supported, webs of the interior of said chamber and deflecting means causing the incoming gas to pass said webs, a gas outlet from said purifier arranged below said chamber so that the gas issuing from said orifice of said gas inlet must pass the webs on the exterior of said chamber after passing the contact material, said webs thus being heated and they conduct the heat to the internal webs in said chamber from which it is taken up by the incoming gas, substantially as described.

In testimony whereof I affix my signature in presence of two witnesses.

ALBERT EDGAR KNOWLES.

Witnesses:
E. DAWSON HARDCASTLE,
WM. CHAS. HANCOX.